United States Patent
Panzer et al.

(10) Patent No.: US 11,346,933 B2
(45) Date of Patent: May 31, 2022

(54) DOPPLER AMBIGUITY RESOLUTION IN MIMO RADARS USING A SIMO EVALUATION

(71) Applicant: GM Global Technology Operations LLC, Detroit, MI (US)

(72) Inventors: Adi Panzer, Tel Aviv (IL); Moshe Levy-Israel, Ashdod (IL); Igal Bilik, Rehovot (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 354 days.

(21) Appl. No.: 16/521,232

(22) Filed: Jul. 24, 2019

(65) Prior Publication Data
US 2021/0026003 A1 Jan. 28, 2021

(51) Int. Cl.
G01S 13/42 (2006.01)
G01S 13/931 (2020.01)
G01S 13/58 (2006.01)
G01S 13/02 (2006.01)
G01S 7/41 (2006.01)

(52) U.S. Cl.
CPC .......... *G01S 13/42* (2013.01); *G01S 7/415* (2013.01); *G01S 13/581* (2013.01); *G01S 13/931* (2013.01); *G01S 2013/0245* (2013.01)

(58) Field of Classification Search
CPC ........ G01S 13/42; G01S 7/415; G01S 13/581; G01S 13/931; G01S 2013/0245
See application file for complete search history.

(56) References Cited

U.S. PATENT DOCUMENTS

| 6,278,785 | B1* | 8/2001 | Thomasson | H04M 9/082 |
| | | | | 379/406.15 |
| 2009/0262006 | A1* | 10/2009 | McNeill | G01S 13/584 |
| | | | | 342/22 |
| 2014/0347212 | A1* | 11/2014 | Tuxen | G01S 13/4454 |
| | | | | 342/147 |
| 2019/0137616 | A1* | 5/2019 | Kishigami | G01S 13/42 |
| 2019/0235068 | A1* | 8/2019 | Hong | G01S 13/723 |
| 2020/0049812 | A1* | 2/2020 | Jansen | G01S 7/358 |

* cited by examiner

*Primary Examiner* — Donald HB Braswell
(74) *Attorney, Agent, or Firm* — Cantor Colburn LLP

(57) ABSTRACT

Embodiments include methods, systems and computer readable storage medium for a method for determining a fine direction of arrival (DOA) for a target is disclosed. The method includes receiving, by a plurality of receivers of a radar system, radar signals reflected by a target. The method further includes mitigating, by the radar system, phase shifts in the radar signals caused by a motion of the target. The method further includes determining, by the radar system, the fine DOA in response to the mitigation of phase shifts and based on the radar signals. The method further includes estimating and storing, by the radar system, a Doppler frequency based on the fine DOA.

10 Claims, 7 Drawing Sheets

DOPPLER AMBIGUITY RESOLUTION IN MIMO RADARS USING A SIMO EVALUATION

INTRODUCTION

The subject disclosure relates to vehicles, and more particularly relates to methods and radar systems for vehicles.

Many vehicles being produced today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. Certain vehicle radar systems, called multiple input, multiple output (MIMO) radar systems, have multiple transmitters and receivers.

These radar systems typically estimate an angle to a target based on a phase difference between a received reflection and a common reference signal at each receiver. The phase difference experienced by each receiver may be used to refine the estimation of the angle to the target. While high angular resolution is obtained by wide aperture radar (i.e., increased field of view), wider spacing (i.e., spacing corresponding with greater than half the wavelength of the common reference signal) between the receivers results in phase differences experienced by each receiver differing by more than $\pi$. This results in an ambiguity in the angle measurements obtained from the different receivers. Accordingly, it is desirable to provide Doppler measurements to resolve this arrival ambiguity angle.

SUMMARY

In accordance with one or more embodiments, a method for determining a fine direction of arrival (DOA) for a target is disclosed. The method includes receiving, by a plurality of receivers of a radar system, radar signals reflected by a target. The method further includes mitigating, by the radar system, phase shifts in the radar signals caused by a motion of the target. The method further includes determining, by the radar system, a fine DOA in response to the mitigation of phase shifts and based on the radar signals. The method further includes estimating and storing, by the radar system, a Doppler frequency based on the fine DOA.

In accordance with one or more embodiments or the method embodiment above, the method can further include outputting location, distance, and speed information for the target.

In accordance with one or more embodiments or any of the method embodiments above, the method can further include estimating, by the radar system, a coarse DOA based on the received radar signals.

In accordance with one or more embodiments or any of the method embodiments above, the method can further include resolving, by the radar system, a Doppler ambiguity using the coarse DOA and a speed associated with the target.

In accordance with one or more embodiments or any of the method embodiments above, the coarse DOA estimation can be based on phase differences between receiver pairs of the plurality of receivers.

In accordance with one or more embodiments or any of the method embodiments above, the method can further include calculating a speed of the target using a plurality of speed hypotheses.

In accordance with one or more embodiments or any of the method embodiments above, the method can further include comparing the coarse DOA to the plurality of speed hypotheses.

In accordance with one or more embodiments or any of the method embodiments above, the method can further include selecting a speed hypothesis from the plurality of speed hypotheses based on a correlation to calibrated data.

In accordance with one or more embodiments or any of the method embodiments above, the radar signals can be transmitted by multiple transmitters.

In accordance with one or more embodiments, a system for determining a fine direction of arrival (DOA) for a target is disclosed. The system includes a vehicle. The vehicle includes a memory, a processor coupled to the memory, and a radar system. The radar system comprises a plurality of transmitters and a plurality of receivers. The radar system is operable to receive radar signals reflected by a target. The radar system is also operable to mitigate phase shifts in the radar signals caused by a motion of the target and determine the fine DOA in response to the mitigation of phase shifts based on the received radar signals. The radar system is also operable to estimate and store a Doppler frequency based on the fine DOA.

In accordance with one or more embodiments or the system embodiment above, the radar system can be further operable to output location, distance, and speed information for the target.

In accordance with one or more embodiments or any of the system embodiments above, the method can further include estimating, by the radar system, a coarse DOA based on the received radar signals.

In accordance with one or more embodiments or any of the system embodiments above, the method can further include resolving, by the radar system, a Doppler ambiguity using the coarse DOA and a speed associated with the target.

In accordance with one or more embodiments or any of the system embodiments above, the coarse DOA estimation can be based on phase differences between receiver pairs of the plurality of receivers.

In accordance with one or more embodiments or any of the system embodiments above, the radar system can be further operable to calculate a speed of the target using a plurality of speed hypotheses.

In accordance with one or more embodiments or any of the system embodiments above, the radar system can be further operable to compare the coarse DOA to the plurality of speed hypotheses.

In accordance with one or more embodiments or any of the system embodiments above, the radar system can be further operable to select a speed hypothesis from the plurality of speed hypotheses based on a correlation to calibrated data.

In accordance with one or more embodiments or any of the system embodiments above, the radar signals can be transmitted by more than one of the plurality of transmitters.

In accordance with one or more embodiments, a non-transitory computer readable medium having program instructions for calculating an estimated speed and fine direction of arrival (DOA) for a target embodied therewith is disclosed. The program instructions executable by the processor to cause receiving radar signals reflected by a target and mitigating phase shifts in the radar signals caused by a motion of the target. The program instructions executable by the processor to cause estimating and storing a Doppler frequency based on the fine DOA.

In accordance with one or more embodiments or the non-transitory computer readable medium embodiment above, the program instructions can be further executable by the processor to cause outputting location, distance, and speed information for the target.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
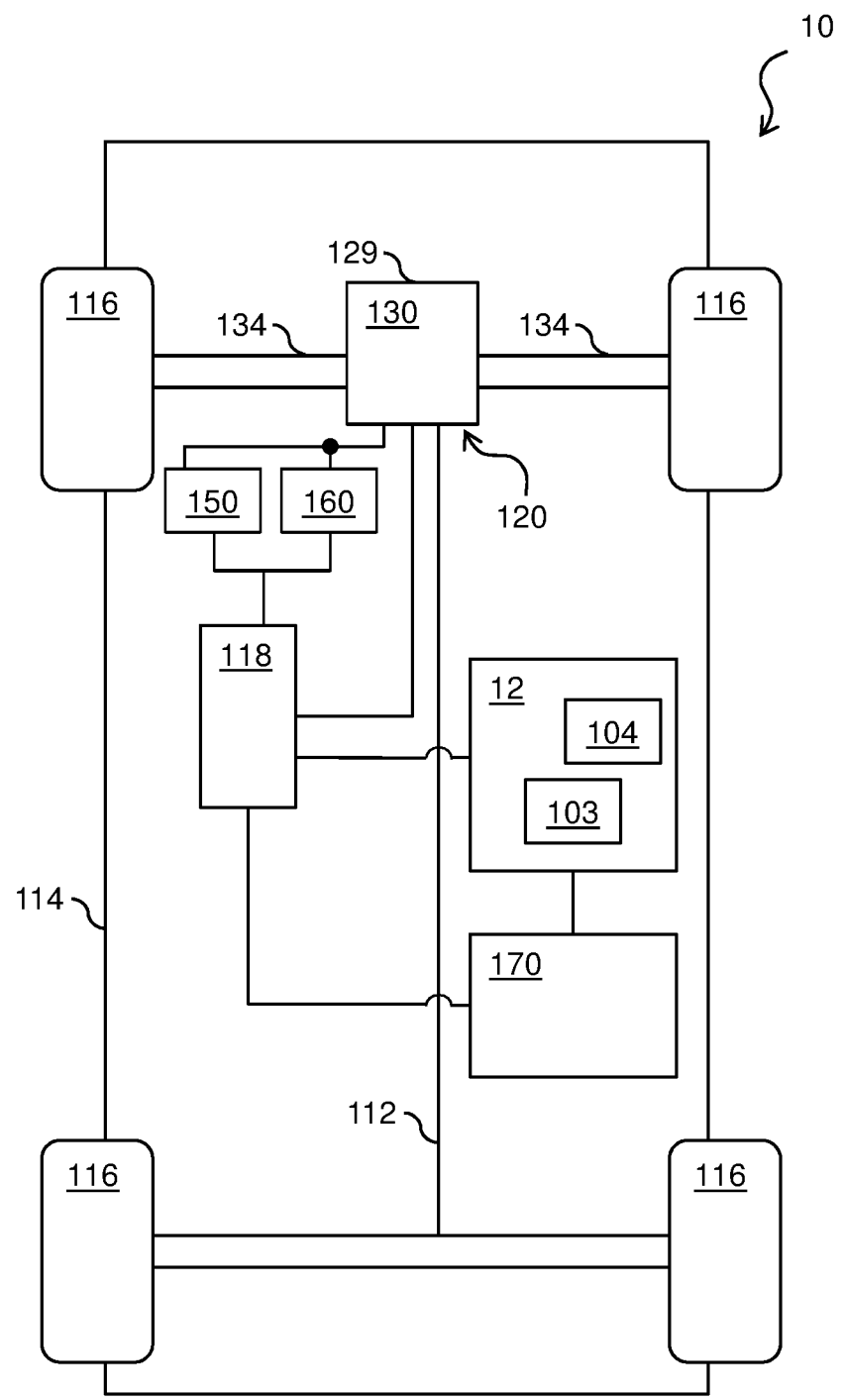
FIG. 1 is a block diagram of a vehicle having a control system, including a radar system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Radar systems including multiple receivers estimate an angle to a target based on a phase difference between a received reflection and a common reference signal at each receiver. Further, the phase difference experienced by each receiver may be used to refine this estimation of the angle to the target. Note that spacing corresponding to greater than half a wavelength of the common reference signal between the receivers results in phase differences experienced by each receiver differing by more than π, which results in an ambiguity in angle measurements obtained from the different receivers. Accordingly, it is desirable to provide Doppler measurements to resolve a direction of arrival ambiguity in radar systems.

FIG. 1 provides a functional block diagram of vehicle 10, in accordance with an exemplary embodiment. As described in further detail herein, the vehicle 10 includes a radar control system 12 having a radar system 103 and a controller 104 that classifies objects based upon a three dimensional representation of the objects using received radar signals of the radar system 103.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near respective corners of the body 114.

In the exemplary embodiment illustrated in FIG. 1, the vehicle 10 includes a powertrain 120. The powertrain 120 includes at least one propulsion system 129 mounted on the chassis 112 that drives the wheels 116. In the depicted embodiment, the powertrain 120 includes an engine 130. In one embodiment, the engine 130 comprises a combustion engine. In other embodiments, the powertrain 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column. The steering wheel receives inputs from a driver of the vehicle 10.

The braking system 160 is mounted on the chassis 112, and provides braking for the vehicle 10. The braking system 160 receives inputs from the driver via a brake pedal, and provides appropriate braking via brake units. The driver also provides inputs via an accelerator pedal as to a desired speed or acceleration of the vehicle 10, as well as various other inputs for various vehicle devices and/or systems, such as one or more vehicle entertainment or infotainment systems, environmental control systems, lightning units, navigation systems, and the like.

Also, as depicted in FIG. 1, in certain embodiments the vehicle 10 may also include a telematics system 170. In one such embodiment, the telematics system 170 is an onboard device that provides a variety of services through communication with a call center remote from the vehicle 10. In various embodiments, the telematics system may include, among other features, various non-depicted features such as an electronic processing device, one or more types of electronic memory, a cellular chipset/component, a wireless modem, a dual mode antenna, and a navigation unit containing a global positioning system (GPS) chipset/component.

The telematics system 170 may provide various services including, but not limited to, turn-by-turn directions services, notification services, and infotainment-related services. The turn-by-turn directions services can be provided with other navigation-related services in conjunction with the GPS chipset/component. The notification services can be provided with airbag deployment services and other emergency or roadside assistance-related services in connection with various sensors and/or sensor interface modules located throughout the vehicle. The infotainment-related services can include, e.g., music, internet web pages, movies, television programs, videogames, and/or other content.

The radar control system 12 is mounted on the chassis 112. As mentioned herein, the radar control system 12 classifies objects based upon a three dimensional representation of the objects using received radar signals of the radar system 103.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
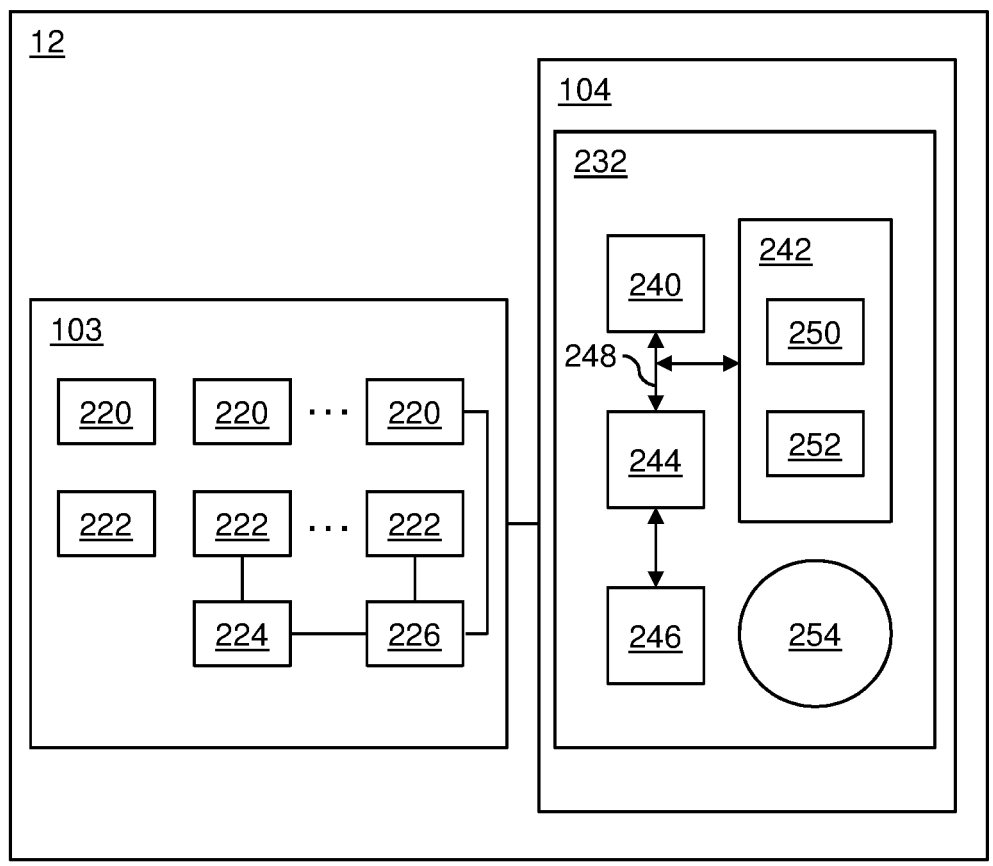
FIG. 2 is a block diagram of the control system of the vehicle of FIG. 1, including the radar system according to one or more embodiments.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 is arranged as an array that includes one or more transmitters 220, one or more receivers 222, a memory 224, and a processing unit 226. In the depicted embodiment, the radar system 103 comprises a multiple input, multiple output (MIMO) radar system with multiple transmitters (also referred to herein as transmission channels (N)) 220 and multiple receivers (also referred to herein as receiving channels (M)) 222. The transmitters 220 transmit radar signals for the radar system 103. After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
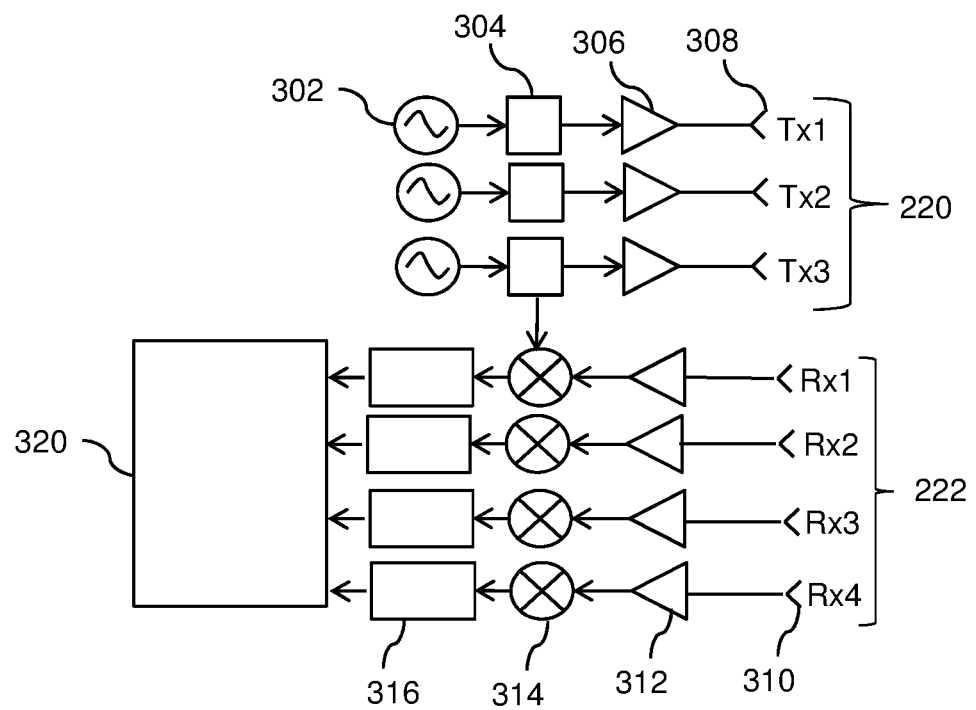
FIG. 3 is a block diagram of a transmission channel and a receiving channel of the radar system of FIGS. 1 and 2 according to one or more embodiments.

FIG. 3 depicts transmission channels 220 along with receiving channels 222 and processor 320 of the radar system 12, in accordance with an exemplary embodiment. Each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316 (e.g., an analog to digital sampler). In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316. The processor 320 can control the array to select which channels to operate in each cycle.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected (e.g., reflected signals), and travel from the other vehicles and/or other objects in various directions, including some signals returning toward the host vehicle 10. The radar signals returning to the host vehicle 10 (also referred to herein as received radar signals) are received by the antenna(e) 310, amplified by the amplifier(s) 312, mixed by the mixer(s) 314, and digitized by the sampler(s)/digitizer(s) 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of a computer system 232 (discussed further herein).

The processing unit 226 processes the information obtained by the receivers 222 for classification of objects based upon a three dimensional representation of the objects using received radar signals of the radar system 103. The processing unit 226 of the illustrated embodiment is capable of executing one or more programs (i.e., running software) to perform various tasks or instructions encoded in the program(s). The processing unit 226 may include one or more microprocessors, microcontrollers, application specific integrated circuits (ASICs), or other suitable device as realized by those skilled in the art. Examples of the processing unit 226 include, but are not limited to, electronic control components, processing logic, processor devices, individually or in any combination that execute one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, the functions of the memory 224 and/or the processing unit 226 may be performed in whole or in part by one or more other memories, interfaces, and/or processors disposed outside the radar system 103 (e.g., such as the memory 242 and the processor 240 of the controller 104 described herein).

As depicted in FIG. 2, the controller 104 is coupled to the radar system 103. Similar to the discussion herein, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of based upon a three dimensional representation of the objects using received radar signals of the radar system 103, and implements appropriate vehicle actions based on this information.

The controller 104 comprises the computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

The computer system 232 includes the processor 240, the memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models. During operation, the processor 240 executes one or more programs 250 contained within the memory 242 and, as such, controls the general operation of the controller 104 and the computer system 232.

The memory 242 can be any type of suitable memory. This would include the various types of random access memory (RAM), the various types of dynamic RAM (DRAM) and static RAM (SRAM), and the various types of non-volatile memory (e.g., flash memory). In certain examples, the memory 242 is located on and/or co-located on the same computer chip as the processor 240. In the depicted embodiment, the memory 242 stores the above-referenced program 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example, from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems and optical disk drives. In one exemplary embodiment, the storage device 246 comprises a program product from which memory 242 can receive a program 250 that executes one or more embodiments of one or more processes of the present disclosure, such as the method 700 (and any sub-processes thereof) described further in FIG. 7. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, programs 250 re stored in the memory 242 and executed by the processor 240.

It will be appreciated that while this exemplary embodiment is described in the context of a fully functioning computer system, those skilled in the art will recognize that the embodiments described herein are capable of being distributed as a program product. The program product can further include one or more types of non-transitory computer-readable signal bearing media used to store instructions and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include, but are not limited to, recordable media such as hard drives, memory cards and optical disks, and transmission media (such as digital and analog communication links). It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4:
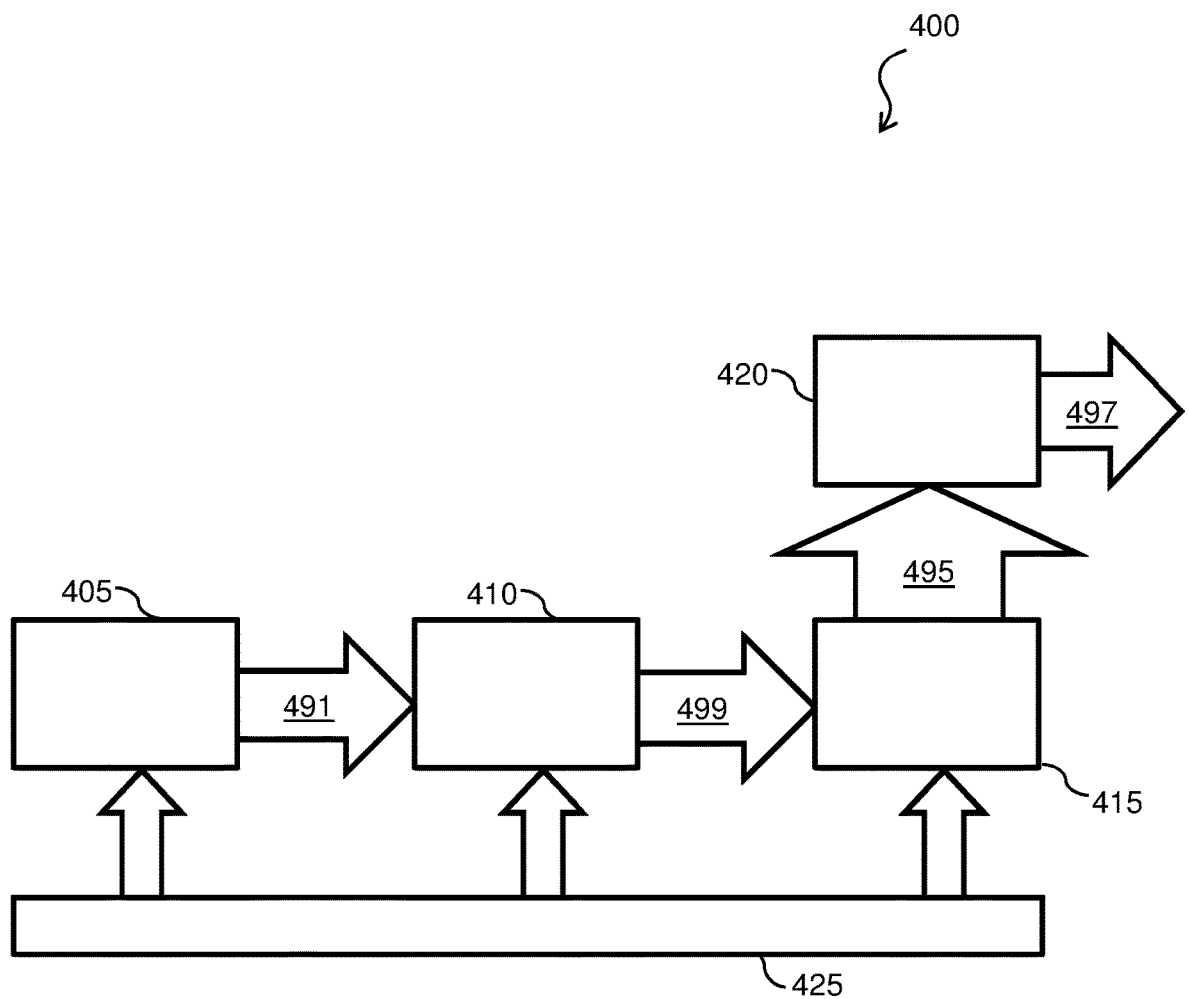
FIG. 4 depicts components of a system associated with vehicles incorporating the radar control system of FIGS. 1-3 according to one or more embodiments.

FIG. 4 depicts components of a system 400 associated with vehicles incorporating the radar control system 12 according to one or more embodiments. The system 400 includes a noncoherent direction of arrival (DOA) module 405, a Doppler ambiguity resolution module 410, a Phase correction module 415 and a coherent DOA estimation module 420.

The noncoherent DOA module 405 can be a single-input-multiple-output (SIMO). Accordingly, the noncoherent DOA module 405 can utilize one of the transmitters 220 and multiple receivers 222 (shown in FIG. 2) to receive reflections from one or more targets and estimate a DOA for a target based on phase differences between each of the receivers 222. The estimation is a rough estimation because the target's speed is unknown. In an embodiment, only the receivers are used to get the rough estimation of the target DOA, not the virtual array.

The DOA can be calculated according to Equation 1 as follows:

$$DOA = \sin^{-1} \frac{\emptyset * \lambda}{D * 2\pi} \qquad \text{Equation 1}$$

where D is a distance between receivers, Ø is a phase difference between receivers and λ is a signal's wavelength.

Because the target's speed is unknown, the receivers 222 are used to determine a rough estimation of the target's DOA (i.e., a coarse DOA 491). The coarse DOA can be determined using phase differences between pairs of receivers 222. The noncoherent DOA module 405 can transmit the coarse DOA to the Doppler ambiguity resolution module 410. The Doppler ambiguity resolution module 410 can estimate a target Doppler frequency using the coarse DOA and output a target's speed 499.

Doppler frequency is a function of the carrier signal, velocity of the target, and angle from the target. Doppler ambiguity can occur due to limited sampling rate of the target phase resulting in aliasing in the measured Doppler frequency of time-division-multiplexing access (TDMA) multiple-input-multiple-output MIMO radar.

A Doppler estimation from phase can be determined by the Doppler ambiguity resolution module 410 according to Equation 2 as follows:

$$\emptyset = \frac{2\pi}{\lambda} * (|TxPos - TargetPos| + |RxPos - TargetPos|) \qquad \text{Equation 2}$$

where TxPos is a value of a transmitter position, TargetPos is a value of a transmitter position and RxPos is a value of a receiver position.

When using the same transmitter and the same receiver, and assuming a target distance that is much greater than the distance between the transmitter and the receiver, the Doppler ambiguity resolution module 410 can calculate a change in Ø according to Equation 3 as follows:

$$\Delta\phi = \frac{4\pi}{\lambda} * \Delta TargetPos_{Radial} \quad \text{Equation 3}$$

where $Pos_{Radial}$ is a range to a target in polar coordinates (i.e., radial range), and ΔTarget is a change in radial range toward the target from the point source radar.

When different transmitters are used, measurements of the target's movement together with transmitter movements can be used. Accordingly, the Doppler ambiguity resolution module 410 can calculate a change in Ø according to Equation 4 as follows:

$$\Delta\phi = \frac{4\pi}{\lambda} * \Delta TargetPos_{Radial} + \frac{2\pi}{\lambda} \Delta TxPos * \sin DOA \quad \text{Equation 4}$$

where the DOA is the coarse DOA.

The Doppler ambiguity resolution module 410 includes a plurality of modules, which are described with reference to FIG. 5.

The Phase correction module 415 can perform coherent processing across virtual channels (i.e., M real channels times N transmitted cycles equal N*M virtual channels 425) by separating a phase-offset caused by motion of the target from a phase-offset caused by the target's DOA. Accordingly, the phase correction module 415 can mitigate a phase shift caused by the target's motion (e.g., mitigating phase shifts in the radar signals caused by the motion of the target). The Phase correction module 415 can output 495 the N*M virtual channels 425 to the coherent DOA estimation module 420.

The coherent DOA estimation module 420 can estimate a coherent DOA using all virtual channels. The coherent DOA estimation module 420 can output a fine DOA value 497. Accordingly, the system 400 can analyze a phase change of the radar echoes originated by different transmitters 220 across the receivers 222 to determine a Doppler frequency for a target in which radar signals have been reflected.

Figure 5:
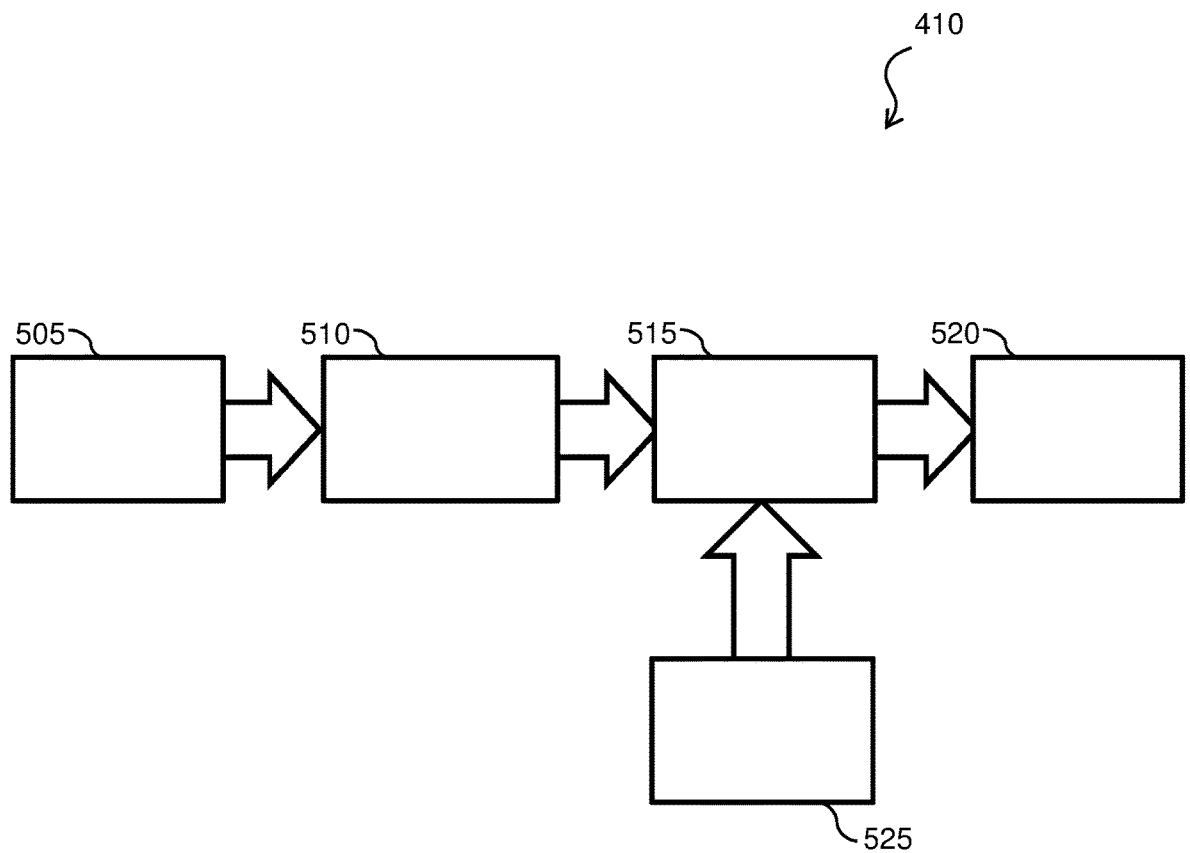
FIG. 5 depicts components of a Doppler ambiguity resolution module according to one or more embodiments.

In FIG. 5, a receiving module 505 of the Doppler ambiguity resolution module 410 receives the coarse DOA. A speed calculation module 510 of the Doppler ambiguity resolution module 410 can be used to calculate a speed 499 of the object using a plurality of speed hypotheses (e.g., 3 speed hypotheses). A comparison module 515 can compare each of the plurality of speed hypotheses to calibration data for the estimated DOA that is received from a calibration data module 525. Selection of a wrong speed hypothesis when attempting to obtain the speed and the DOA of the target can cause cancellation between signals from different TDMA cycles, resulting in a correlation energy (e.g., a low correlation energy, which refers to every transmission from different antenna: at every time instance only 1 antenna is transmitting so that there is low cross-correlation between transmissions from different antennas).

During a calibration phase, the phase of each virtual channel for each angle is recorded. When a target is detected, the calibration phase is removed from measurements and a complex summation can be performed. Input data for a hypothesis that has a similar phase to the calibration data will have a higher correlation energy after summation.

The correlation energy can be calculated according to Equation 5 as follows:

$$\text{CorrelationEnergy} = \|\Sigma_n X_n * e^{-i*\theta_n}\| \quad \text{Equation 5}$$

where $\theta_n$ is a measured phase during calibration and $X_n$ is complex input data.

The calibration data module 525 can store reference data, such as, a steering vector (e.g., an ideal steering vector, which refers disregarding impartments of practical antenna array: coupling between channels, errors in manufacturing errors in spacing between elements, etc.). The steering vector represents a set of phase-delays for an incoming wave received at each receiver 222. The steering vector can be a J-by-K complex-valued matrix. In this matrix, J represents the number of element positions in the array while K represents the number of incoming waves. A hypothesis selection module 520 can select a hypothesis from the plurality of hypotheses having a highest correlation (e.g., dot product) to the correlation data. Accordingly, the selected hypothesis can provide both the speed and the DOA of the target.

A DOA estimation can be calculated using combined DOA data from all receiving channels 222. The DOA estimation of the target can be used to eliminate phase differences caused due to changing transmitters between cycles.

Figure 6:
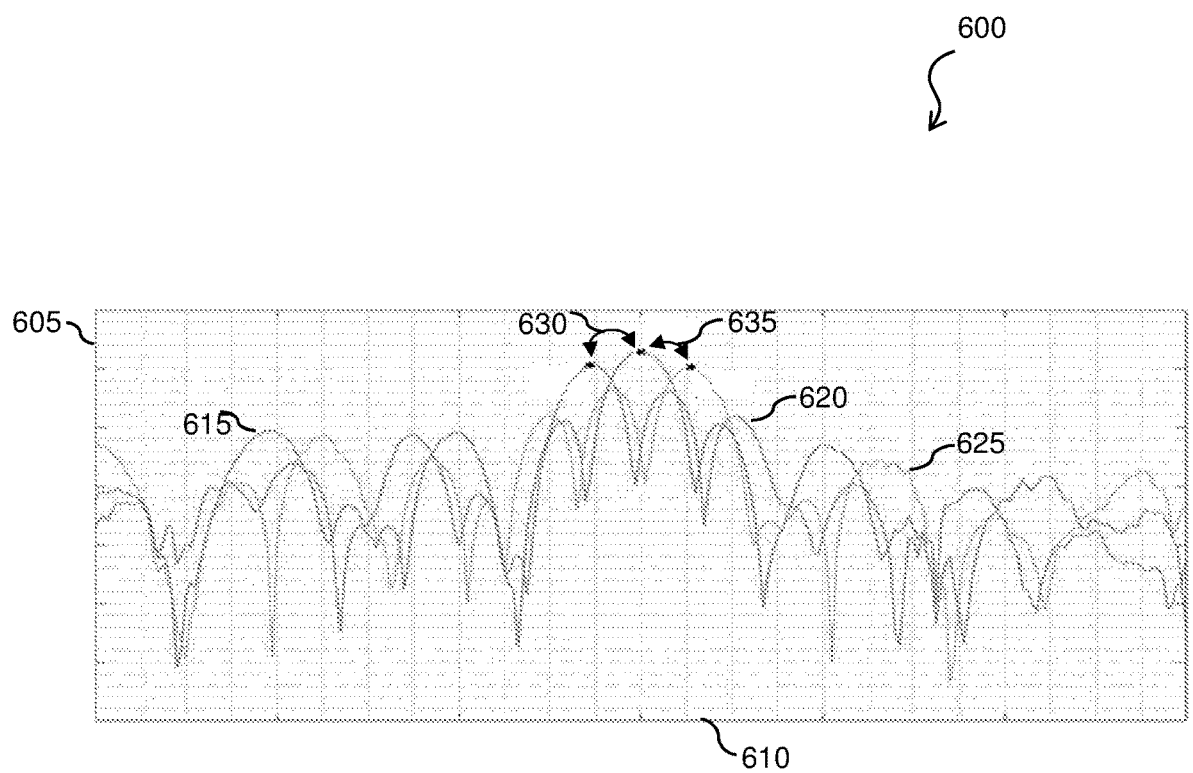
FIG. 6 depicts an exemplary power versus DOA plot of radar measurements taken by the radar system of FIGS. 1-3 according to one or more embodiments.

FIG. 6 depicts an exemplary power 605 versus DOA 610 plot 600 of radar measurements taken by the radar system 400 according to one or more embodiments. The plot 600 illustrates calculations of object speed based on a plurality of speed hypotheses, (e.g., hypothesis 615, hypothesis 620 and hypothesis 625). The plot depicts hypothesis 615 having 2 dB gaps to hypotheses 630 and 635, respectively. Because hypothesis 615 has a highest peak at zero DOA, hypothesis 615 has a highest correlation to calibrated data. Accordingly, hypothesis 615 is the correct speed hypothesis and can be used to provide an estimated speed and fine DOA for a target.

Figure 7:
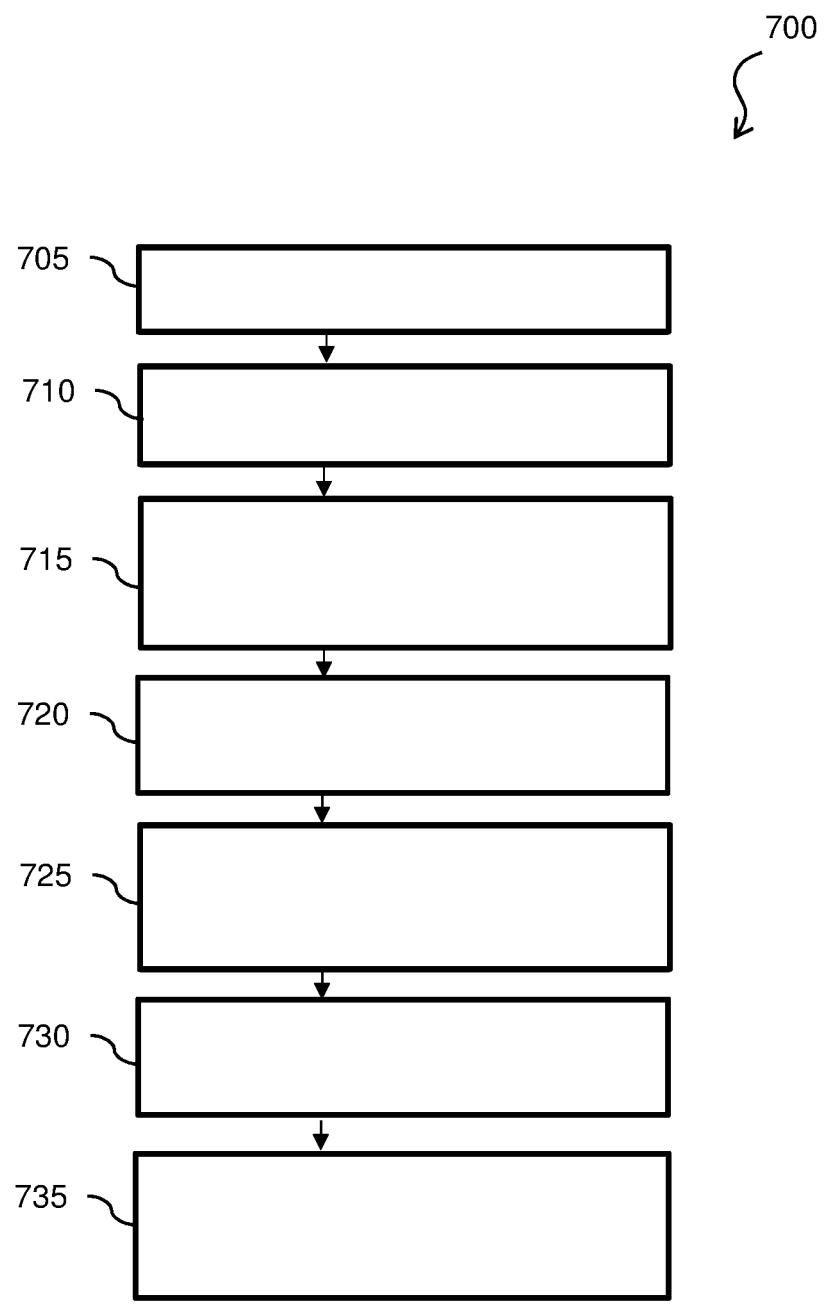
FIG. 7 depicts a flow diagram of a method for calculating an estimated speed and fine DOA for a target according to one or more embodiments.

FIG. 7 depicts a flow diagram of a method 700 for calculating an estimated speed and fine DOA for a target according to one or more embodiments. At block 705, a radar system (e.g., the radar system 400 of FIG. 4) can transmit via associated transmitters (e.g., the transmitters 220 of FIG. 2) radar signals that are reflected by an object/target.

At block 710, the radar signals are received by the radar system via associated receivers (e.g., the receivers 222 of FIG. 2). At block 715, the radar system can estimate a coarse direction of arrival (DOA) for the received radar signals by analyzing phase differences between a given pair of receivers. The coarse DOA can be determined without a determination of a speed of the target.

At block 720, the radar system can resolve a Doppler ambiguity by estimating a target Doppler frequency based on the coarse DOA and a speed of the target. At block 725, the radar system can mitigate phase shifts caused by the target's motion by separating the phase-offset caused by motion of the target from a phase-offset caused by the target's DOA. At block 730, the radar system can estimate a fine DOA for the received radar signals using a plurality of virtual channels and target motion compensation for the target's motion (e.g., determining the fine DOA in response to the mitigation of phase shifts and based on the radar signals). At block 735, the radar system can store the estimated Doppler frequency and/or output location, distance, and/or speed information for the target using the fine DOA, which can be displayed and/or used by a vehicle for a variety of applications (e.g., collision avoidance).

Accordingly, the embodiments disclosed herein describe a system that can increase maximum unambiguous Doppler speed without changing transmit regime or using multiple frames, by analyzing phase change between transmitters. The system also can resolve a radar Doppler ambiguity by analyzing phase changes of radar echoes originated by different transmitters across receivers. The system can also allow a maximum speed to be limited by a basic pulse interval, regardless of the number of transmitters being used.

The system described herein can approximate DOA estimation using receivers only (i.e., not using coherent energy between TDMA cycles). The system can also estimate target Doppler using the coarse DOA. The system can also mitigate phase shift caused by target's motion. The systems can also estimate a fine DOA using all virtual channels.

Technical effects and benefits of the disclosed embodiments include, but are not limited to improving radar performance by using an estimated DOA that allows provides improved discrimination between speed hypotheses. Processes associated with the system have low computational complexity through a comparison of input data to a specific entry in calibration data. After the speed of a target has been estimated, a phase shift caused by the target's motion can be compensated. The compensated data can be used for more accurate DOA estimation.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for determining a fine direction of arrival (DOA) for a target, the method comprising:
    receiving, by a plurality of receivers of a radar system, initial noncoherent radar signals reflected by the target based on transmission by one of a plurality of transmitters;
    determining a coarse DOA based on the initial noncoherent radar signals;
    receiving, by the plurality of receivers of the radar system, radar signals reflected by the target based on transmission by the plurality of transmitters;
    mitigating, by the radar system, differences in phase shifts in the radar signals resulting from using the plurality of transmitter from phase shifts in the radar signals caused by a motion of the target by estimating a target speed using the coarse DOA;
    determining, by the radar system, the fine DOA in response to the mitigation of phase shifts and based on the radar signals.

2. The method of claim 1 further comprising outputting location, distance, and speed information for the target.

3. The method of claim 1, further comprising calculating a speed of the target using a plurality of speed hypotheses.

4. The method of claim 3, further comprising comparing the target speed using the coarse DOA to the plurality of speed hypotheses.

5. The method of claim 4, further comprising selecting a speed hypothesis from the plurality of speed hypotheses based on a correlation to calibrated data.

6. A system for determining a fine direction of arrival (DOA) for a target, the system comprising:
    a vehicle comprising: a memory; a processor coupled to the memory; and a radar system comprising a plurality of transmitters and a plurality of receivers, the radar system being operable to:
    receive initial noncoherent radar signals reflected by the target based on transmission by one of the plurality of transmitters; determine a coarse DOA based on the initial noncoherent radar signals;
    receive radar signals reflected by the target based on transmission by the plurality of transmitters;
    mitigate differences in phase shifts in the radar signals resulting from using the plurality of transmitter from phase shifts in the radar signals caused by a motion of the target by estimating a target speed using the coarse DOA; and
    determine the fine DOA in response to the mitigation of phase shifts and based on the radar signals.

7. The system of claim 6, wherein the radar system is further operable to output location, distance, and speed information for the target.

8. The system of claim 6, wherein the radar system is further operable to calculate a speed of the target using a plurality of speed hypotheses.

9. The system of claim 8, wherein the radar system is further operable to compare the target speed using the coarse DOA to the plurality of speed hypotheses.

10. The system of claim 9, wherein the radar system is further operable to select a speed hypothesis from the plurality of speed hypotheses based on a correlation to calibrated data.

* * * * *